June 10, 1969     C. C. SONS, JR     3,448,784
TIRE PATCH FOR REPAIRING PNEUMATIC TIRES
Filed Nov. 18, 1966
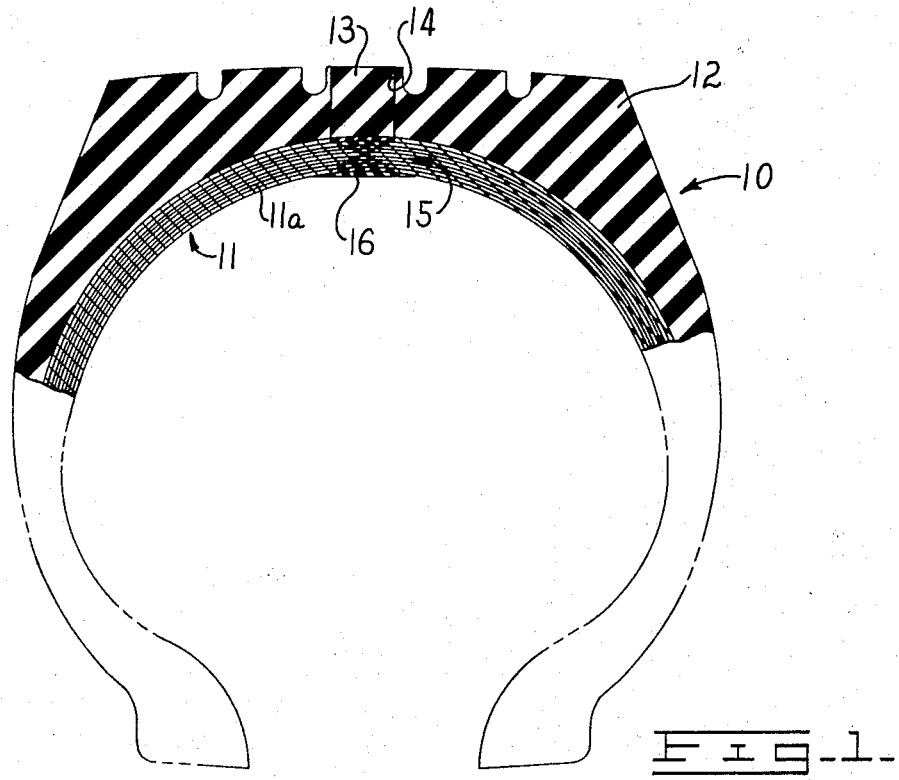
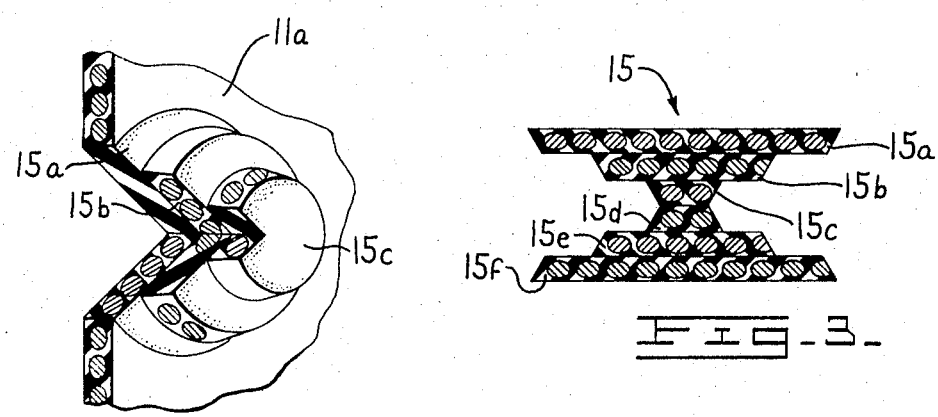
INVENTOR.
CHARLES C. SONS JR.

3,448,784
TIRE PATCH FOR REPAIRING PNEUMATIC TIRES
Charles C. Sons, Jr., Peoria, Ill., assignor to Caterpillar Tractor Co., Peoria, Ill., a corporation of California
Filed Nov. 18, 1966, Ser. No. 595,478
Int. Cl. B60c 21/06, 7/22
U.S. Cl. 152—370          6 Claims

ABSTRACT OF THE DISCLOSURE

A puncture in a pneumatic tire is reamed to form a plurality of stepped-down recesses through the tire's carcass plies. A patch having a double frusto-conical configuration and constituting a plurality of superimposed plies is bonded to such plies within the recesses. The conically shaped patch portions meet at the apexes thereof intermediate the carcass plies.

---

This invention relates to a tire patch for repairing pneumatic tires and more particularly relates to an improved patch arrangement adapted to be structurally integrated into a damaged tire so that the tire will exhibit physical characteristics comparable to those afforded prior to such damage.

Conventional tire patches oftentimes fail when subjected to strenuous use over a rather short period of time. Since large tires employed in earthmoving operations, for example, cost upwardly of $5,000 it can be seen that considerable expense would be involved should a damaged tire be scrapped rather than adequately repaired. Even though the damage has merely constituted a small puncture in the tire's carcass in many instances, prior failures to seal the carcass have resulted in such tire scrapage. One standard patch comprises a conically shaped rubber plug which is inserted into a tire puncture and sealed therein by a rubber boot. Variations of such a patch include the utilization of superimposed ply arrangements, such as those disclosed in U.S. Patent Nos. 3,080,987, 3,101,764, 3,133,585, 3,160,194 and 3,198,234. Tire flexing at a footprint area thereof may cause a shearing effect between the conventional patch and carcass plies which results in patch failure, particularly when the repaired tire is subjected to strenuous use.

An object of this invention is to provide an improved and economical tire patch arrangement adapted to be structurally integrated into the area of a tire's damaged carcass so that the tire will exhibit physical characteristics comparable to those afforded prior to such damage. The patch arrangement comprises a plurality of superimposed plies arranged in stepped-down relationship with respect to each other and secured within corresponding stepped-down recesses formed in the area of the damaged carcass plies. In the preferred embodiment of this invention, such a stepped-down arrangement is provided at both the inner and outer sides of the damaged carcass with each patch ply arranged substantially flush with respect to an adjacent carcass ply. A boot may be secured to the inner side of the damaged carcass to aid in forming an air-tight seal thereat.

Further objects of this invention will become apparent from the following description and accompanying drawings wherein:

FIG. 1 is a cross-sectional view illustrating a pneumatic tire repaired by a preferred tire patch embodiment of this invention;

FIG. 2 is a partial view of the tire patch of FIG. 1 with parts broken away for clarification purposes; and FIG. 3 is an enlarged, cross-sectional view of the tire patch of FIG. 1.

FIG. 1 illustrates a conventional pneumatic tire 10 repaired in accordance with the teachings of this invention. The tire comprises a plurality of superimposed carcass plies 11 suitably wrapped about standard bead wires (not shown) and having a tread portion 12 suitably bonded thereto. The repaired tire has a rubber-based plug 13 suitably secured within a reamed repair hole 14 formed in tread portion 12. A preferred patch arrangement 15 comprises a plurality of superimposed patch plies 15a–15f (FIG. 3) initially vulcanized, cold cemented or otherwise suitably bonded to each other and also to the adjacent carcass plies. A conventional rubber-based boot member 16 may be suitably bonded to the inner side or ply of the tire's carcass to aid in forming an air-tight seal thereat over the patch.

Each carcass ply is preferably arranged in a conventional manner to have the major reinforcing cords thereof form acute or right angles relative to the cords of an adjacent ply to increase overall carcass strength. The above mentioned patents disclose such ply arrangements and also disclose a variety of suitable constituents therefor. As is well known in the art, each ply essentially comprises a plurality of parallel major cords, such as nylon, bonded together by a suitable elastomer. Multiplied patch 15, illustrated in cross-section in FIG. 3, may constitute similar constituents adapted to be suitably bonded to and structurally integrated with adjacent carcass plies. The outer edge of each patch ply is preferably tapered in the same direction, as illustrated in FIG. 3, to facilitate insertion of the patch into a mating, tapered recess formed in each adjacent carcass ply.

It should be noted that the diameter of each successive patch ply is stepped down from 15a to 15c and stepped up from 15d to 15f. Such an arrangement affords greater flexibility at outer patch plies 15a and 15f than at inner plies 15c and 15d. The gradual change in flexibility aids in preventing separation as between the integrated patch and carcass plies when the tire is flexed during use. Although each patch ply preferably comprises a circular configuration, it should be understood that in certain applications it may prove desirable to employ an oval, rectangular or otherwise suitably shaped patch ply.

Also, in certain repair applications only a stack of patch plies, such as 15a–15c, need be utilized, i.e., the patch would assume the frusto-conical configuration constituting patch plies 15a–15c in FIG. 3. However, the double frusto-conical configuration illustrated in FIG. 3 wherein the apex portion of each of the first and second cone portions meet (at corresponding plies 15c and 15d) is preferred for most repair applications. In particular, such a patch will resist shearing effects caused by tire flexing in all directions. It should be further noted that the number of patch plies utilized may be equal to, greater than, or less than the number of carcass plies employed in the tire. However, for tires employing more than 10 plies, it is preferred to utilize a number of patch plies less than the number of such carcass plies.

When a punctured or otherwise damaged tire is to be repaired, aperture 14 is initially reamed in tread portion 12 to expose the damaged carcass area. Suitable tooling may be employed to form stepped-down or graduated recesses in the plies of carcass 11 which conform with the outside diameters of the stacked patch plies 15a–15f. In this particular embodiment of the invention, three stepped-down recesses would be formed on each of the outer and inner sides of the carcass. Patch portions 15a–15c would be inserted into the three recesses formed on the outside of the carcass whereas patch plies 15d–15f would be inserted into the three recesses formed on the inside of the carcass (FIG. 1).

Referring briefly to FIG. 2, it should be noted that the reinforcing cords of patch ply 15a, for example, are preferably orientated in substantial parallel relationship relative to the major cords of adjacent carcass ply 11a. In addition, it can be seen that patch ply 15a is preferably maintained substantially co-planar or in flush relationship with respect to carcass ply 11a. Patch plies 15d–15f would be orientated in a like manner with respect to their respective carcass plies. The patch plies are then vulcanized, cold cemented or otherwise suitably bonded to their respective carcass plies. A conventional boot 16 is then preferably vulcanized or otherwise suitably secured to the carcass and patch for effecting an air-tight seal thereat.

It should be understood that tire manufacturers employ various winding techniques for forming the superimposed carcass plies. A tire patch made for the purpose of repairing a particular tire could constitute a physical makeup corresponding exactly to that of the carcass ply to which it will be secured. For example, an uncured, partially cured or fully cured plug could be molded into the shape assumed by patch plies 15a–15c in FIG. 3 with each patch ply having a desired thickness and cord makeup and disposition to structurally relate it in a predetermined manner to the carcass ply to which it is to be secured. It should be further understood that the thickness of each patch ply may be different from the thickness of a corresponding carcass ply and can comprise a physical makeup which is different from such carcass ply. Alternatively, the tire patch could be suitably cut to a desired shape out of a large sheet of laminated material having the various plies thereof properly oriented to match the orientation of the corresponding carcass plies.

What is claimed is:

1. A repaired pneumatic tire comprising a plurality of superimposed carcass plies having a tread portion bonded to an outside thereof, each of said plies having a recess cut therein, said recesses being stepped down from the outside and inside, respectively, toward the center of the carcass plies, and a patch having a double frusto-conical configuration forming two patch portions meeting at apexes thereof between the outside and inside of said carcass plies, each of said patch portions comprising a plurality of superimposed patch lies arranged in stepped-down relationship and secured to said carcass plies within said stepped-down recesses thereof.

2. The invention of claim 1 wherein each one of said patch plies is further arranged in substantially flush relationship with respect to an adjacent one of said carcass plies.

3. The invention of claim 2 wherein said carcass and patch plies each comprise a plurality of parallel reinforcing cords bonded together by an elastomer, each adjacent patch and carcass ply further arranged to have their respective reinforcing cords orientated in substantial parallel relationship with respect to each other.

4. The invention of claim 2 wherein the outer edge of each of said patch plies and the edge of each of said carcass plies forming said stepped-down recesses are tapered so that each patch ply mates with an adjacent carcass ply.

5. The invention of claim 1 wherein each patch ply comprises a circular configuration, the diameters of said patch plies being different from each other to substantially form patch portions having a frusto-conical configuration.

6. The invention of claim 1 further comprising a boot member bonded to an inner ply of said carcass and arranged to cover said patch to form an air-tight seal thereat.

References Cited

UNITED STATES PATENTS

| | | | |
|---|---|---|---|
| 1,591,817 | 7/1926 | Hawkinson | 152—367 |
| 3,088,512 | 5/1963 | Buckland | 152—370 |
| 3,282,319 | 11/1966 | Barnett | 152—367 |

ARTHUR L. LA POINT, *Primary Examiner.*

C. B. LYON, *Assistant Examiner.*

U.S. Cl. X.R.

152—203